United States Patent Office 3,276,562
Patented Oct. 4, 1966

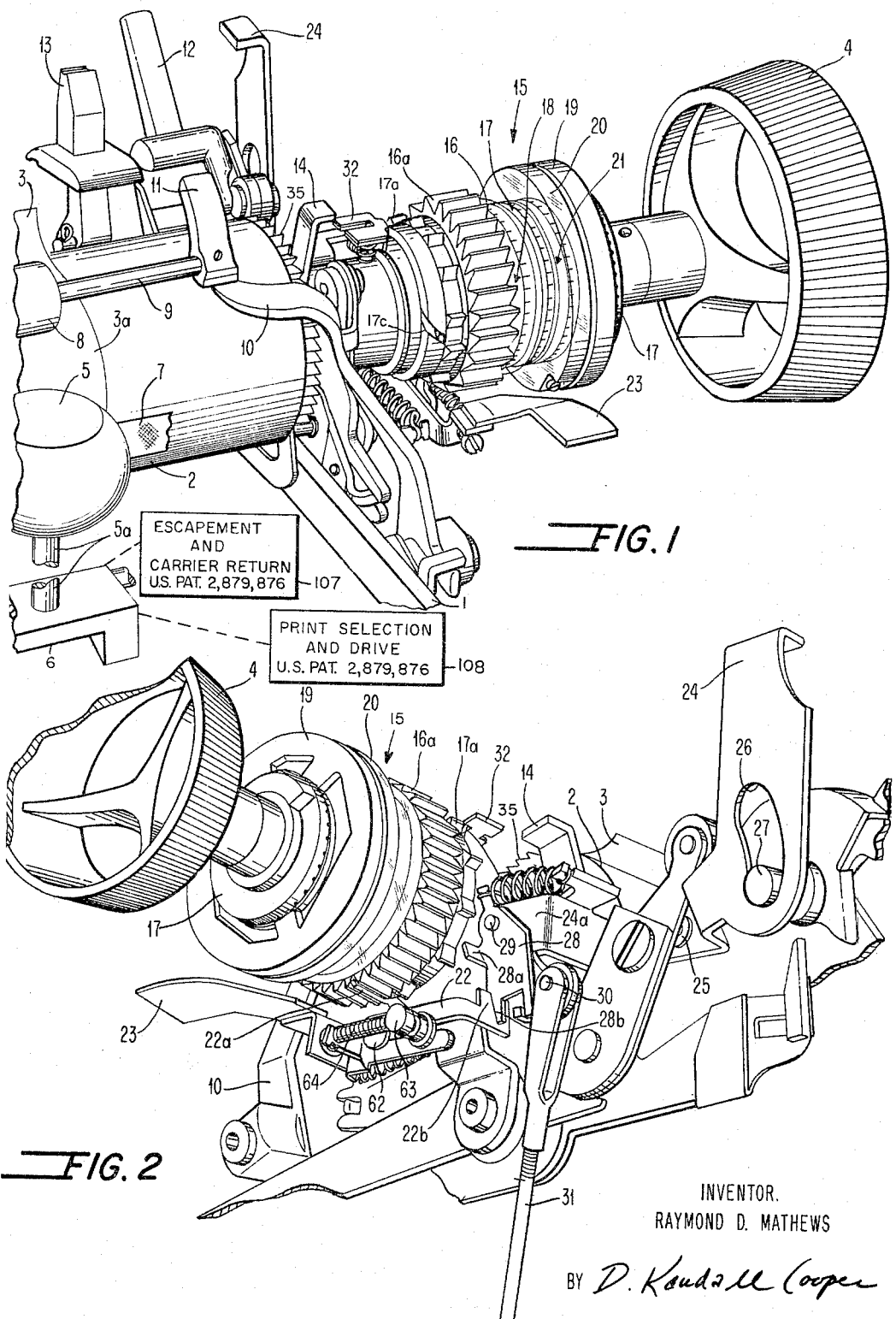

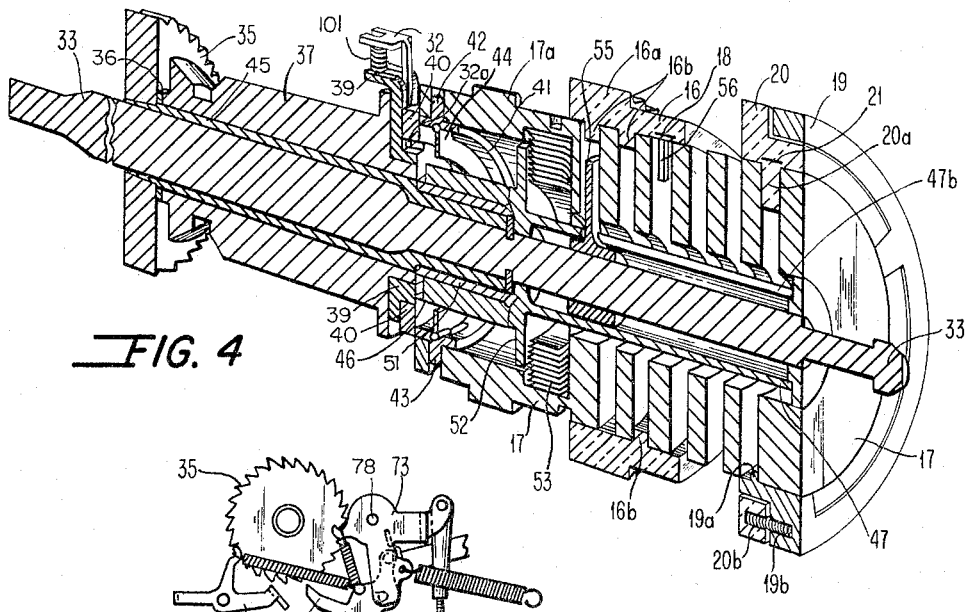
FIG. 4
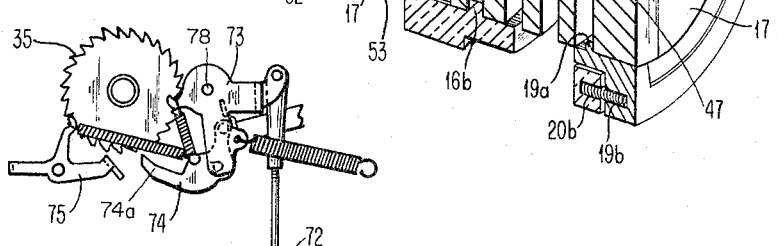
FIG. 6a
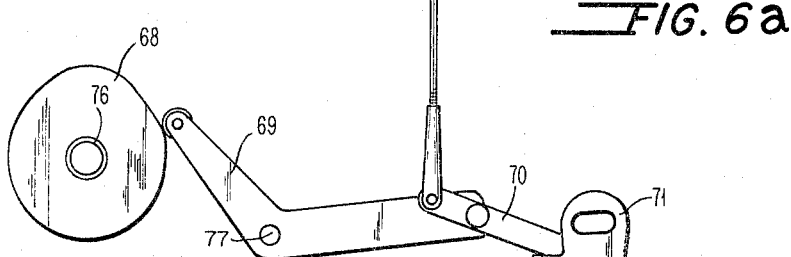
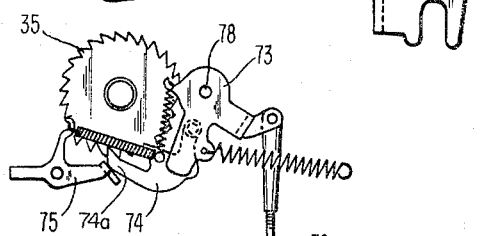
FIG. 6b
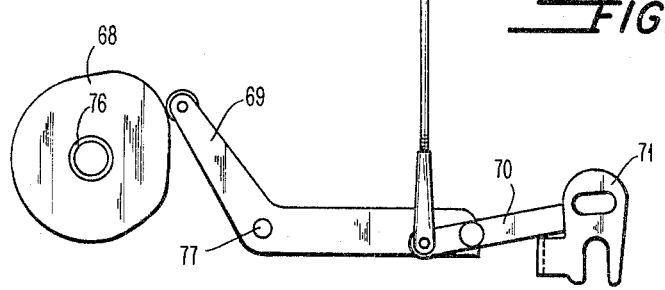

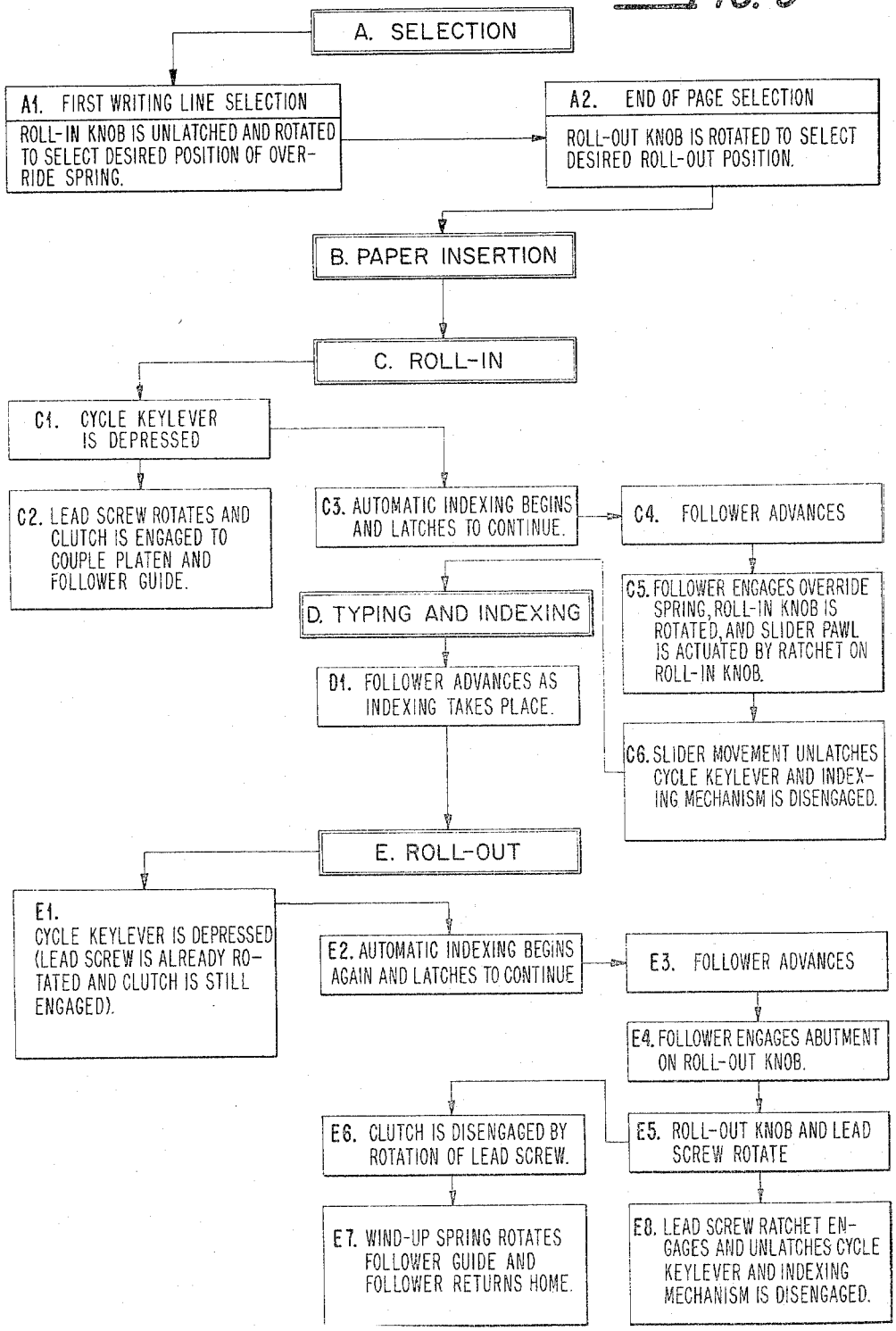

3,276,562
AUTOMATIC DOCUMENT HANDLING AND
CONTROL APPARATUS
Raymond D. Mathews, Lexington, Ky., assignor to International Business Machines Corporation, New York, N.Y., a corporation of New York
Filed Dec. 19, 1963, Ser. No. 331,661
11 Claims. (Cl. 197—127)

This invention relates to automatic document handling apparatus and more particularly to apparatus for controlling the feeding of documents, such as sheets of paper, to an initial printing line in a typewriter or similar machine, and for subsequently ejecting the same upon completion of the typing operation.

The invention is disclosed in conjunction with a single element typewriter such as that described in U.S. patent 2,879,876, L. E. Palmer et al. The Palmer typewriter has a platen which is rotated for document indexing but which is not movable laterally as in a typebar typewriter. Printing is done with a single element print head mounted on a carrier and having all characters of a type font positioned in a predetermined array about its periphery. Spacing between characters is accomplished by moving the carrier step by step in a path adjacent the platen and parallel with respect thereto.

Since the earliest development of the typewriter, numerous mechanisms have been proposed for automating the various procedures connected with typing. Of particular interest are those devices concerned with handling the paper on which typing is performed. Considerable time is expended by a typist in inserting and positioning individual sheets of paper and in gauging the amount of paper already typed upon, or that remaining to be typed.

Accordingly, an object of the invention is to facilitate the handling of documents, such as paper sheets, in a printing machine or similar device.

Another object of the invention is to automate to a considerable extent the paper feeding procedures in a typewriting machine.

A further object of the invention is to provide auxiliary apparatus for automatic handling of paper which is compact and easy to use, and which can be installed in a typwriting machine with minimum modifications required.

Still another object of the invention is to provide a simple and accurate line gauging feature for a typewriter.

A further object of the invention is to simplify the paper insertion and ejection procedures for a typewriting machine.

Another object of the invention is to reduce the time required by a typist to insert and position individual sheets of paper at the first line of printing in a typewriting machine.

A still further object of the invention is to provide document handling means for a typewriter which is automatically operative for the most part but in which some operator selectively and control is retained.

In accordance with a preferred embodiment of the invention, a document feeding, handling, and control device is provided for a typewriting machine which can be preset by an operator to positions that correspond to first and last printing lines, which is automatically operative under operator control to position individual documents, such as sheets of paper according to the selected settings and which also supplies an at-a-glance indication of the line currently being typed as the paper passes through the machine. The device is automatically restored to home position in readiness for a new document concurrently with the ejection of the preceding document.

The foregoing and other objects, features, and advantages of the invention will be more apparent from the following more particular description of the preferred embodiment of the invention as illustrated in the accompanying drawings.

In the drawings:

FIGS. 1 and 2 are different, but related views, that are representative of a typewriting machine in which the document or paper control mechanism according to the present invention is positioned in proximity to and in operative relationship with the platen of the machine.

FIG. 4 is a cross-sectional view of the paper control device.

FIGS. 5a, 5b, 6a, and 6b depict line indexing mechanisms for the typewriting machine of FIGS. 1 and 2.

Figure 7A:
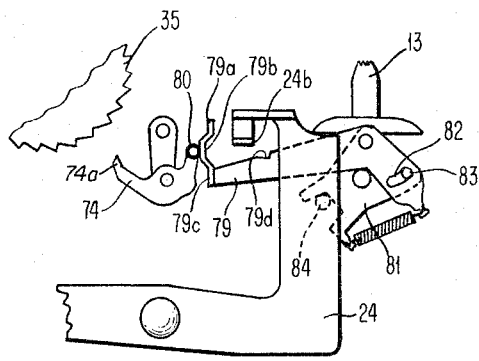
Figure 7B:
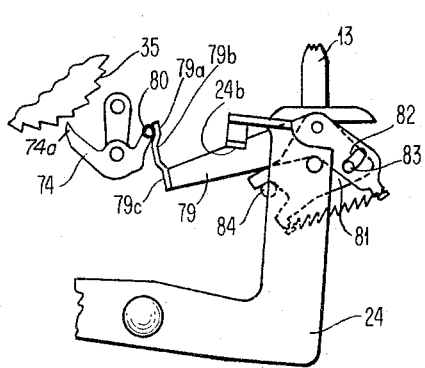
Figure 7C:
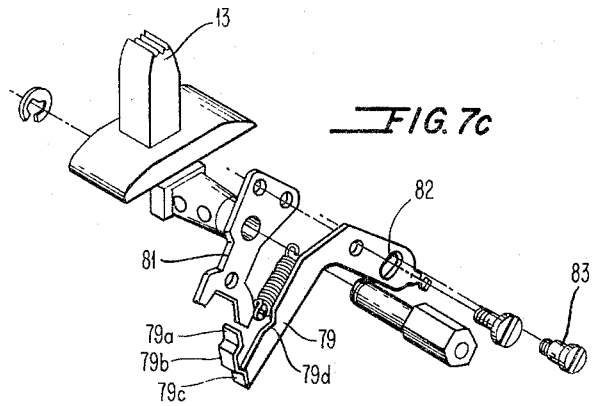

FIGS. 7a, 7b, and 7c show mechanism for selectively establishing single or double line spacing (indexing) in the typewriting machine of FIGS. 1 and 2.

FIGS. 8a, 8b, 8c, and 8d represent various set up and operating conditions of the paper control device in FIGS. 1 and 2.

FIG. 9 is a sequential presentation of the setup and operation of the device of FIGS. 1 and 2.

Figure 10A:
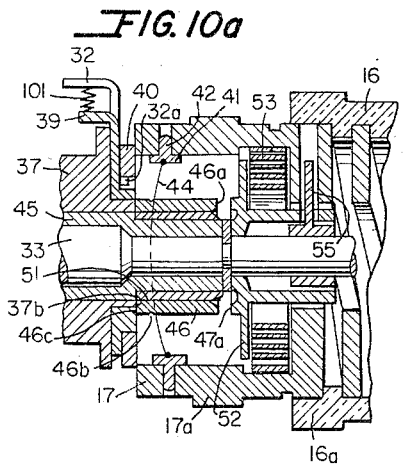
Figure 10B:
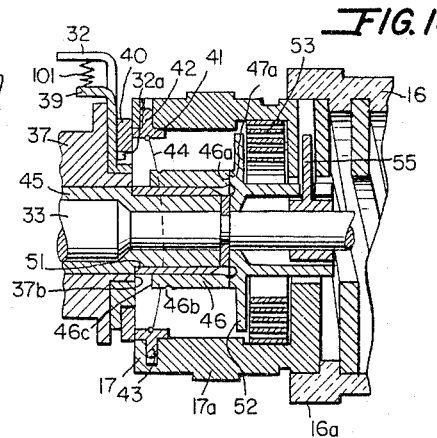

FIGS. 10 and 10b illustrate engaging and disengaging action of a spring clutch used in the paper control mechanism.

FIGS. 1 and 2 show pertinent portions of a typewriting machine. The machine has a frame 1 on which certain mechanisms are supported. The machine has a platen 2 for accommodating and feeding a sheet of paper 3 during typing.

FIG. 1 is an oblique view of the machine from the typist's position. FIG. 2 is an oblique view of the platen and paper control mechanism from a position slightly to the right rear of the machine. The sheet of paper 3 can be manually positioned about platen 2 by means of a platen knob 4 which is at right end of the platen as viewed in FIG. 1. Also shown in FIG. 1 is a single element print head 5 such as that shown in the aforementioned Palmer patent. The print head 5 is mounted on a shaft 5a that is supported by a carrier 6. Carrier 6 is moved generally from left to right in FIG. 1 by escapement mechanism as typing proceeds from the left hand edge of paper 3 to the right hand edge 3a of paper 3 and restored to the left by carrier return mechanism included in the block 107. Selection of character for printing on the print head 5 is effected by conventional type keys that control a print selection and drive mechanism. Print head 5 is rotated and tilted to select a desired character for printing. Following the selection of a character the print head 5 is reciprocated from a rest position toward the paper 3 and presses a ribbon 7 against the paper 3 in order to print the selected character. Paper 3 is maintained against the platen 2 by means of paper rollers, such as roller 8. Roller 8 is mounted on a supporting shaft 9 which in turn is attached to a paper bail 10. Roller 8 and bail 10 are selectively movable toward and away from platen 2 under control of a finger grip 11 which can be operated by the typist. The machine also has a number of other control levers and elements including a paper release lever 12 and a single-double spacing index selector knob 13. The paper release lever 12 enables the typist to release pressure on the paper 3 while it is in position around the platen 2 for fine positioning of the paper 3. The single-double spacing index selector knob 13 is associated with certain mechanisms that are shown in detail in FIGS. 6a, 6b, 7a, 7b, and 7c for selecting either a single spacing paper feed operation or a double spacing paper feed operation. The platen can be selectively removed from the machine by operation of a platen release latch 14.

The machine of FIGS. 1 and 2 is provided with certain other control levers and associated mechanism for controlling the feeding of an individual sheet of paper such as sheet 3 through the typewriting machine. The paper control mechanism, generally designated 15, includes a transparent roll-in selector knob and ratchet assembly 16 which can be selectively rotated upon an indexing lead screw 17 and which has an arrow head 18 for indicating the first line of typing that has been selected by the typist. The paper control mechanism further includes a dual roll-out selector knob assembly which comprises a roll-out detent ring 19 and an associated transparent roll-out selector knob 20. Roll-out knob 20 has an arrow head 21 on its inner periphery adjacent the lead screw 17 which provides the typist with an indication of the last line of typing. Ring 19 and knob 20, like the roll-in selector knob 16 can be selectively positioned by the typist for selecting the last line of typing or the last portion of a sheet of paper to which automatic indexing will take place.

Normally, one of the ratchet teeth 16a on roll-in selector knob 16 is in engagement with a detent tooth 22a of a slider pawl 22. Slider pawl 22 has a trip lever 23 associated therewith which is depressed by the typist in order to move the portion 22a out of engagement with the ratchet teeth 16a, thereby permitting free rotation of the selector knob 16 on lead screw 17 in order to set up a different first line of typing. The roll-out selector assembly comprising ring 19 and knob 20 are not detented like the roll-in selector knob. Selection of the last line of typing to which automatic indexing is required is made by depressing the transparent roll-out selector knob 20 toward the detent ring 19 which thereupon permits the entire assembly of ring 19 and knob 20 to be rotated about the lead screw 17 in order to establish a roll-out position which is different from that to which the assembly was set previously.

Once the roll-in and roll-out selection has been made by the typist, the apparatus is made automatically operative by depression of a cycle actuating keylever 24. Keylever 24 is pivotally mounted at 25 for movement within a range determined by a slot 26 and a pin 27. Keylever 24 has a forward extension 24a on which a cycle actuating pawl 28 is pivotally mounted on a stud 29. Pawl 28 has an ear 28a which is adapted for engagement with ratchet teeth 17a on lead screw 17. Pawl 28 also has a stepped portion 28b which is positioned in proximity to an extension 22b of the slider pawl 22. When the mechanism is inactive, the various elements just discussed assume the positions shown in FIG. 2.

Briefly, in order to activate the paper control mechanism, keylever 24 is depressed by the typist. Depression of keylever 24 results in the movement of pawl 28 upward so that extension 28a engages a tooth 17a on lead screw 17 thereby engaging a clutch mechanism, as will be explained in detail later, and step 28b on pawl 28 is latched on slider pawl 22 at 22b. Also attached to keylever 24 at 30 is an index cam trip clevis link 31 which couples the indexing mechanism to the operating cams of the typewriting machine.

When a detent 32 is depressed, the entire paper control assembly 15 can be rotated in order that the typist may conveniently see the index marks 18 and 21 in case the roll-in knob 16 and the roll-out knob 20 have been rotated to an index position which lies on the side of the lead screw opposite the typist's viewing position.

Reference is further made to FIGS. 3, 4, 5a, and 5b which show various ones of the elements already discussed in connection with FIGS. 1 and 2, as well as additional elements involved in the mechanism.

Figure 3:
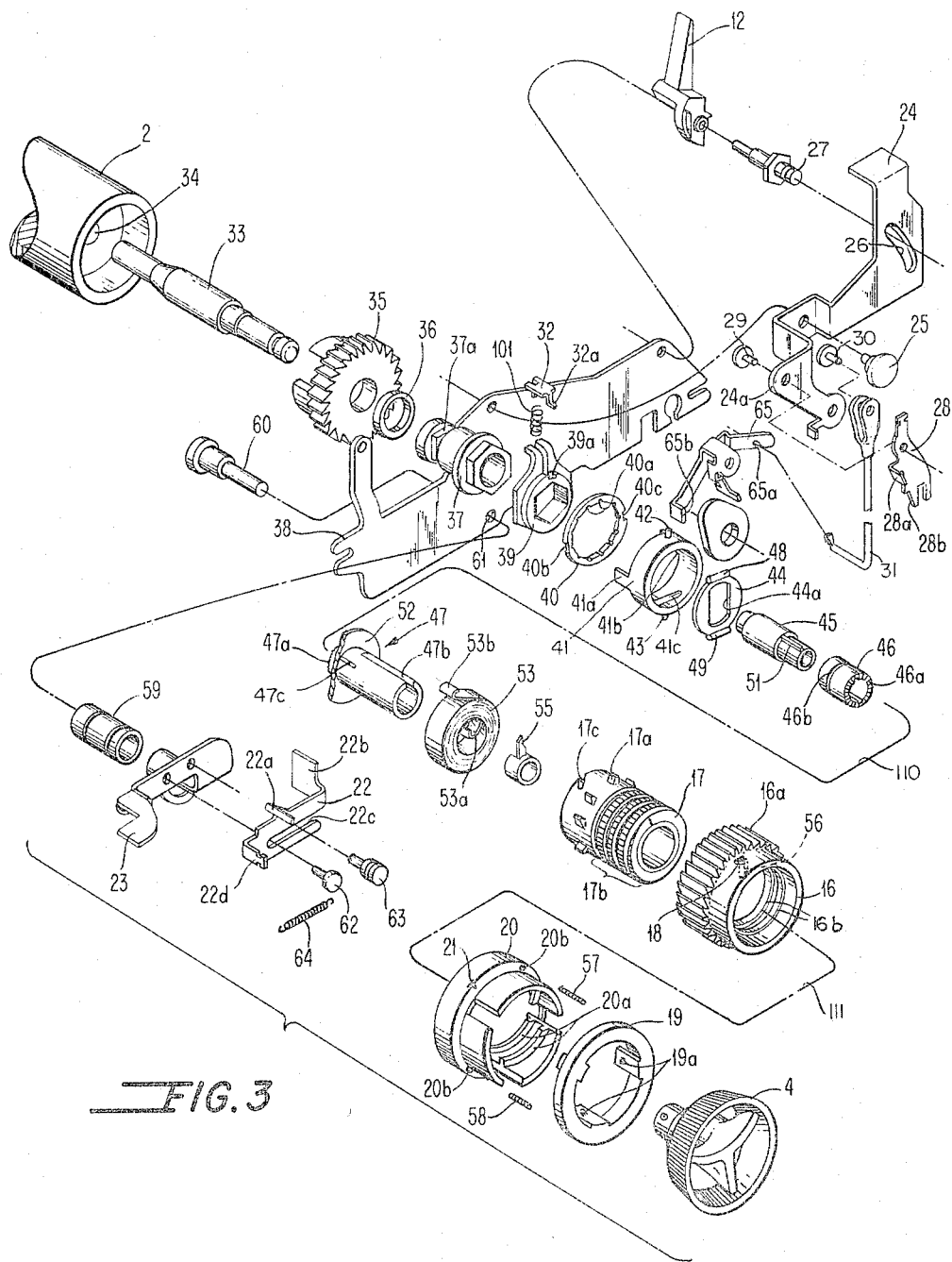
FIG. 3 is an "exploded" view of the paper control mechanism of FIGS. 1 and 2.

In FIG. 3, the platen 2 has a right hand platen shaft 33 which is fixedly mounted in an opening 34 in the platen. Extending generally to the right of the shaft 33 in FIG. 3 and along the guide lines 110 and 111 are a number of elements which are compactly arranged and mounted for operation in an assembled fashion as shown in FIG. 4.

Fixedly mounted on shaft 33 is a platen index ratchet 35 which is stepped under control of various mechanisms shown in FIGS. 6a and 6b. The relative positioning of the ratchet 35 on shaft 33 can be observed in FIG. 4. Mounted on shaft 33 adjacent ratchet 35 is a washer 36 and next to this is a platen bushing 37. Bushing 37 has a hexagonal shaped portion 37a which slips into the frame supporting member 38 onto which various ones of the assemblies involved are mounted.

Detent 32 is mounted for movement in a lead screw detent bracket 39 with ear 32a on detent 32 engaging in detent guide 39a. A spring 101 maintains detent 32 in an upward position. When in the upward position, extension 32a of detent 32 engages one of the notches 40a on a detent ring 40. As previously noted, the relative positioning of the paper control device with respect to the platen 2 can be changed by depressing detent 32, disengaging extension 32a from the notch 40a with which it is presently engaged, rotating the paper control assembly 15 to a new position and re-engaging the extension 32a on detent 32 with another notch 40a on detent ring 40.

Slidably engaged with ring 40 in notches 40b and 40c are ears 41a and 41b of a diaphragm spring housing 41. Housing 41 also has pins 42 and 43 extending therefrom which are engaged to rotate housing 41 when the mechanism is actuated. A flip-flop or "cricket" type diaphragm spring 44 is part of a spring type coupling mechanism or clutch which includes housing 41, driving shaft 45, face clutch member 46, and follower guide member 47. Shaft 45 is press fitted to platen shaft 33, FIG. 4, and is rotated as shaft 33 is rotated. Spring 44 has enlarged portions 48 and 49 which are positioned within associated grooves (such as groove 41c for portion 49) in housing 41. Member 46 has a portion 46a with a face type ratchet that is adapted for engagement with a complementary ratchet portion 47a on follower guide 47. Member 46 is mounted for sliding movement on the driving shaft 45 by means of a key 51.

As is usual with this type for spring clutch, when diaphragm spring 44 is inserted into position within housing 41 it is flexed into a curved position to the left or to the right depending upon the relative positioning of housing 41. Spring 44 has an internally cut opening 44a, the edges of which engage a groove 46b in face clutch member 46. When spring 44 is flexed to the left, face clutch 46 will also be moved to the left on drive shaft 45 and when spring 44 is flexed to the right, face clutch 46 will also be moved to the right. When face clutch 46 is in the leftmost position on drive shaft 45, as in FIG. 10a, the portion 46a of clutch 46 is out of engagement with the portion 47a of follower guide 47. On the other hand, when face clutch 46 is moved to the right under the urging of spring 44, as in FIG. 10b, the ratchet portion 46a of face clutch moves into engagement with the ratchet portion 47a of follower guide 47. When face clutch 46 is engagement with follower guide 47, guide 47 will rotate in a step by step manner whenever the platen 2 is rotated by the indexing mechanism.

Positioned against the collar 52 on guide 47 is a follower return spring 53. The extremity 53a of spring 53 engages a notch 47c and guide 47. The other extremity 53b of spring 53 engages a slotted recess, not shown, in lead screw 17. When the spring clutch is engaged and follower guide 47 is rotating in step by step synchronism with platen 2 during indexing of platen 2, spring 53 is wound into a tighter condition than it is when the mechanism is in a home position. Mounted within the guide 47 is a follower 55 which projects from a slot 47b in follower guide 47. Lead screw 17 has a portion 17b which is formed into a helical guide path. Follower 55, selector knob 16, selector knob 20, and detent ring 19 are formed with projections which engage the helical path in lead screw 17 and which permit their being rotated along lead screw 17 in a manner comparable to the movement of a nut backward and forward on a threaded bolt. The relative positioning of the elements just mentioned can be observed to a great extent in FIG. 4, and FIGS. 8a, 8b, 8c, and 8d. In these figures, it will be observed that follower 55 projects up into the helical path 17b in lead screw 17. During operation of the device, follower 55 moves on a spiral course generally from left to right. This can be observed by noting FIGS. 8b, 8c, and 8d which respectively represent the home position, an intermediate position, and a final position of the device prior to restoration of the follower 55. As can be seen in FIGS. 4, 8b, 8c, and 8d, roll-in selector knob 16 has an internal threaded portion 16b which is adapted for engagement with the grooves 17b in lead screw 17. Similarly, roll-out selector knob 20 has projecting threaded portions 20a which are formed in a spiral fashion to engage the grooved portion 17b of lead screw 17. Roll-out detent ring 19 also has projecting teeth 19a which are positioned in a similarly spiral fashion within ring 19 for threaded engagement with the grooved portion 17b of lead screw 17.

Roll-in selector knob 16 has a spring member 56 which is mounted on the knob 16 in such a manner that it extends into lead screw 17 in a manner similar to the projections 16b. As roll-in selector knob 16 is rotated in a spiral path about lead screw 17, spring member 56 will assume different relative positions within the grooved portions 17b which have a direct relationship to the position of a paper 3 as it passes through the typewriting machine during typing. Also, the spiral threaded portion 20a of roll-out selector knob 20 ends in an abutment which is shown in FIGS. 4, 8b, 8c, 8d and which is moved within the grooved portion 17b of lead screw 17 as roll-out selector knob 20 is rotated. The abutment assumes different relative positions that also have a direct relationship with respect to the position of a sheet of paper 3 as it moves around the platen 2 during a typing operation.

The position of the spring member 56 on roll-in selector knob 16 determines the first line of printing on a sheet of paper, such as paper 3. The abutment of portion 20a on roll-out selector knob 20 determines the last line of printing on the sheet of paper 3.

Roll-out selector knob 20 has apertures, such as apertures 20b, which are adapted to receive spring elements, such as spring elements 57 and 58, FIG. 3. Detent ring 19 has corresponding apertures 19b which correspond in number with and which are positioned in a complementary fashion with respect to apertures 20b for receiving the other ends of the spring elements. The spring elements, such as elements 57 and 58, exert a slight force which tends to maintain the roll-out selector knob 20 and detent ring 19 separated from one another. When properly positioned about lead screw 17, knob 20 and ring 19 are thereby maintained in proper tension within the grooves 17b. In order to change the roll-out position of the device, roll-out selector knob 20 is manually pressed toward ring 19 to overcome the tension of the spring elements, such as elements 57 and 58. The entire assembly comprising ring 19 and knob 20 can thereby easily be rotated in the grooved portion 17b of lead screw 17 to establish a different roll-out position.

Trip lever 23 is mounted for rotation on a hub 59 which in turn is mounted on a stud 60 that extends through an opening 61 in the support member 38. Slider pawl 22 has a slotted portion 22c which is adapted for sliding movement on pins 62 and 63. A spring 64 is attached at one end to an extension 22d on slider pawl 22 and at the other end to the pin 63. As viewed in FIG. 2, spring 64 maintains slider pawl 22 in tension toward the pin 63.

Figure 5A:
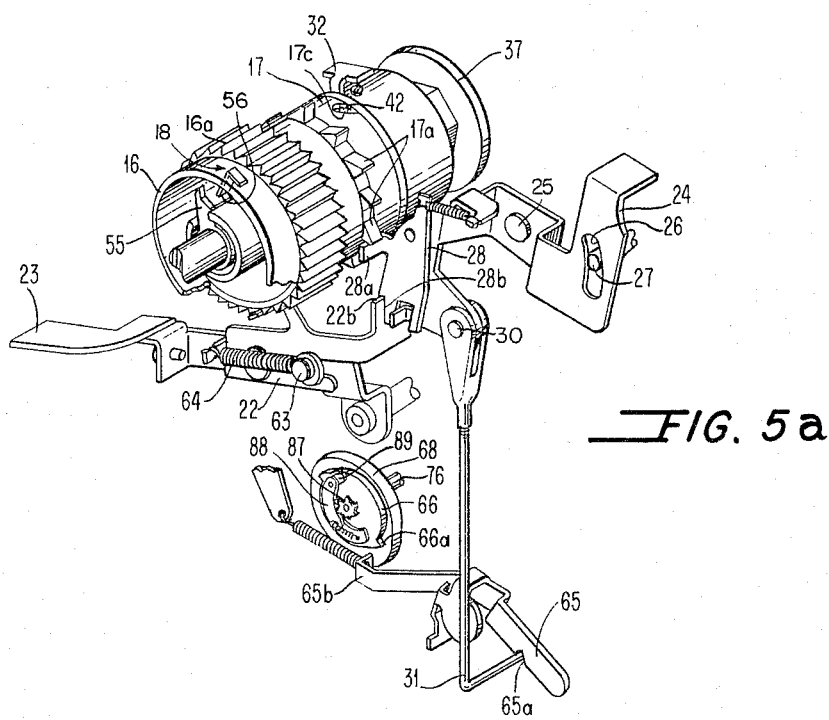
Figure 5B:
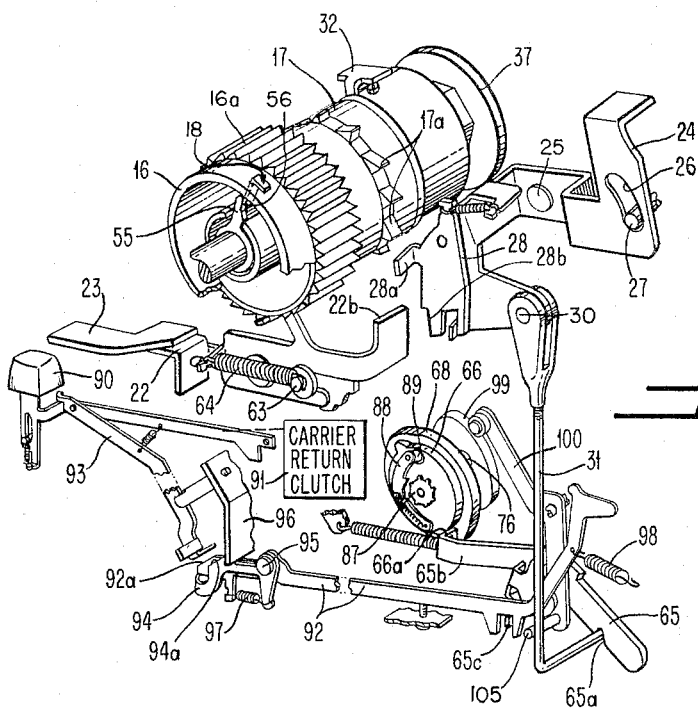

Other elements of interest in FIG. 3 are the index cam trip lever 65 which has a notch 65a that engages the lower extension of index cam trip clevis link 31. Trip lever 65 has an extended portion 65b which is engageable with a cam 66 that is shown in FIGS. 5a and 5b.

Figure 8A:
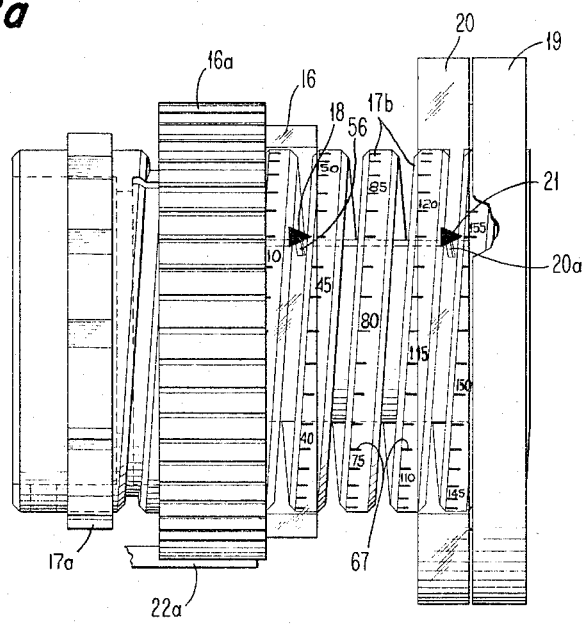

As noted before, the positions of the roll-in selector knob and the roll-out selector knob have definite and predetermined relationships with respect to the position of a sheet of paper feeding through the typewriter machine. Since the lead screw 17 has a spiral groove, a considerable linear distance can be represented along the length of the spiral portion 17b. Portion 17b has index marks 67 which can best be observed in FIGS. 8a, 8b, 8c and 8d. Marks 67 extend the entire length of the grooved portion 17b and are spaced apart a distance that is equal to one line space on platen 2. As shown in FIG. 8a, every fifth mark is designated such as marks 40, 45 and 50. As an example, if it is assumed that a line space on platen 2 measures one-eighth of an inch, then eight lines will be accommodated in each inch of rotation of platen 2. If it is desired to accommodate a sheet of paper that is twenty inches long, then one hundred sixty line spaces will be involved (8 x 20). Approximately this number of index marks is shown on grooved portion 17b of lead screw 17 in FIG. 8a, the last visible mark being designated 155. If the platen index ratchet 35 has 36 teeth, then the teeth 16a on the roll-in selector knob 16 should correspond in number, that is 36. The spacing of the index marks, FIG. 8a, will also correspond to the spacing of the teeth on ratchet 35. Accordingly, the number of teeth of rotation of ratchet 35 and the attached platen 2 can be directly represented by the index marks 67 on grooved portion 17b. The device disclosed herein is first operative under control of the link 31, trip lever 65, and indexing cam 68, FIGS. 5a, 5b, 6a and 6b, to feed a sheet of paper to the first line of typing. Subsequently, while typing is taking place, line spacing or conventional indexing is also performed under control of the indexing mechanism shown in FIGS. 5a, 5b, 6a and 6b. If the typist finishes typing prior to reaching the selected roll-out position as determined by the roll-out selector knob 20, then the sheet of paper can be automatically stepped to the roll-out position under control of the indexing mechanism, as during a roll-in operation.

During the entire course of feeding of a sheet of paper, the line position on the paper will continually be represented by the position of follower 55 within the helical portion 17b of lead screw 17.

The conventional line spacing of platen 2 will first be discussed by reference to FIGS. 6a and 6b. FIG. 6a represents the rest position of the indexing mechanism, while FIG. 6b represents the active condition of the mechanism. The indexing mechanism can be controlled to single space or double space under control of the selection mechanism shown in FIGS. 7a, 7b and 7c. Basically, the operation of the indexing mechanism for a single space operation occurs as follows. Platen ratchet 35 is driven during a line spacing operation under control of indexing cam 68 (concentrically affixed to shaft 76) and indexing cam follower 69. Follower 69 is connected to a multiplying lever 70 which has an associated stop member 71 that is affixed to the frame. Attached to one extremity of the multiplying lever 70 is a pawl carrier link 72. Link 72 is attached to an index pawl carrier 73 which in turn supports an index pawl 74. Pawl 74 has an associated platen over throw stop 75. During an indexing operation, shaft 76 and cam 68 rotate and follower 69 is moved clockwise about pivot point 77. When the high point of cam 68 is reached, as shown in FIG. 6b, the right end of follower 69 moves in a downward direction. The movement of the right end of follower 69 downwardly results in the attached multiplying lever 70 being moved downwardly. When this happens, link 72 is pulled downwardly and rotates carrier 73 clockwise about the pivot point 78. With this movement of carrier 73, index pawl 74 will be moved to the left in FIG. 6b into engagement with a tooth in the ratchet 35 to rotate platen 2. Overthrow of platen 2 is prevented by the stop 75.

Ordinarily, the movement of pawl 74 results in one line space of ratchet 35 and the attached platen 2. Selection of a double space operation, instead of a single space operation, is performed under control of the spacing mechanism shown in FIGS. 7a, 7b, and 7c. Index pawl 74 has an associated line space cam lever 79 which controls the relative position of pawl 74 with respect to the ratchet 35. Line space cam lever 79 has an extension with a number of stepped portions 79a, 79b, and 79c. When the mechanism is as shown in FIG. 7a, the high stepped portion of extension 79b will be in contact with a stud 80 on index pawl 74. This will move portion 74a of pawl 74 further away from the ratchet 35 and during an indexing operation will result in a rotation of ratchet 35 and platen 2 which corresponds to a single spacing of platen 2. The extent of line spacing, that is, single or double spacing, during the roll-in and the roll-out operation, as well as during the typing operation subsequent to a roll-in operation and prior to a roll-out operation is normally under control of the index selector lever 13, as previously noted. Index selector lever 13 has a control element 81 which is movable to a single space position or to a double space position within the limits imposed by a stud 84. Slot 82 is provided in cam lever 79 while stud 83 is mounted on the element 81. As viewed in FIGS. 7a and 7b, the element 81 is in its lower single space position. In the absence of control exerted by cycle actuating lever 24, the high stepped portion 79b on lever 79 will be in engagement with index pawl 74 thereby effecting a single space operation. Lever 79 has a notched portion 79d which is adapted for engagement with an extension 24b on the actuating lever 24. Lever 24 is normally actuated from its home or restored position to a first actuated position shown in FIG. 7a. If actuating lever 24 is depressed further to a second actuated position, as shown in FIG. 7b, lever 79 is moved downwardly so that the shallow stepped portion 79a is then in contact with stud 80 on index pawl 74. This results in the movement of the left portion 7a of pawl 74 somewhat closer to ratchet 35 and, as a consequence, when pawl 74 is moved during an indexing operation, ratchet 35 and associated platen 2 will be rotated a relatively greater distance which is equivalent to a double space. If a double spacing operation is desired at all times under control of lever 13, lever 13 is moved to the right which corresponds to the rear of the typewriting machine and attached element 81 is thereby moved upward against stop 84. With this movement of element 81, cam lever 79 will be moved upward above the position in which it is shown in FIG. 7a. As a result, the shallow stepped portion 79c will then be in engagement with stud 80. This results in the repositioning of index pawl 74 closer to ratchet 35 and effects a double spacing operation instead of a single spacing operation.

Operation

Operation of the paper control mechanism can best be observed by reference to FIGS. 8a, 8b, 8c, 8d, and FIG. 9. FIGS. 8a, 8b, 8c, and 8d show various setup and operating conditions of the device, while FIG. 9 is a sequential representation of a typical operation. In FIG. 9, it will be seen that the first major step in the sequence is Step A, selection, which includes Steps A1 and A2.

In Step A1, the selection of the first writing line is performed by positioning roll-in selector knob 16 so that the arrow head 18 points to the desired line position. In order to be able to rotate roll-in selector knob 16, the roll-in trip lever 23 is first depressed by the typist to move the detent tooth 22a of slider pawl 22 out of engagement with the currently engaged ratchet tooth 16a. When trip lever 23 is depressed, knob 16 can be freely rotated on lead screw 17 to take up a different position. As shown in FIG. 8a, selector knob 16 has been positioned on lead screw 17 so that the arrow head 18 points to line position 47. This would then be the first line of typing that is desired by the typist.

The typist next performs Step A2, which is the selection of the end of the page or the roll-out position. This is done by depressing the roll-out selector knob 20 toward the roll-out detent ring 19 thereby overcoming the spring tension of the compression springs 57 and 58 that are shown in FIG. 3. When this is done the entire roll-out selector assembly including ring 19 and knob 20 can then be rotated on lead screw 17 to select a new roll-out position. In FIG. 8a, the roll-out position is indicated by arrow head 21 as being line 155. This would represent the last line of typing on any inserted sheet of paper.

In FIG. 9, the next major step in the operation is Step B which is Paper Insertion step. Following the insertion of the paper into a position where it can be gripped by platen 2 for feeding purposes, the roll-in operation is performed. The roll-in operation is designated Step C in FIG. 9, and includes six minor steps respectively designated C1–C6. The roll-in operation can best be observed by reference to FIGS. 5a and 5b. Step C1 requires that the typist depress the cycle actuating keylever 24. Depression of keylever 24 in FIG. 5a results in the movement of the actuating pawl 28 upward toward teeth 17a of lead screw 17. Movement of pawl 28 against a tooth 17a of lead screw 17 results in rotation of lead screw 17 in a generally counter-clockwise direction in FIG. 5a. Lead screw 17 has notched cam surfaces 17c into which the pins 42 and 43 on housing 41 are positioned. It will be recalled that housing 41 contains the spring member 44 which is flexed into one or the other of two curved positions under control of the movement of housing 41 (FIGS. 10a and 10b). As lead screw 17 moves counter-clockwise in FIG. 5a, notches 17c also move in a counter-clockwise direction. This exerts a force on pins 42 and 43 which moves housing 41. The movement of housing 41 can best be observed in FIGS. 3, 10a and 10b where it will be recalled that housing 41 has ears 41a and 41b in engagement with notches 40b and 40c of detent ring 40. In FIG. 10a, housing 41 is shown to the right, spring 44 is flexed to the left and the clutch is disengaged. The initial rotation of lead screw 17 effects movement of housing 41 generally to the left in from the position shown in FIG. 10a to that shown in FIG. 10b. This changes the flexure of spring 44 to the right due to engagement of portion 46c of face clutch 46 with abutment 37b of bushing 37 and with the change in flexure of spring 44, the face clutch 46 with which it is engaged moves to the right into engagement with the clutch portion 47a of follower guide 47. Therefore, the initial rotation of lead screw 17 results in the engagement of the clutch mechanism so that the follower guide 47 will be coupled to the ratchet 35 and associated platen 2. Movement of platen 2 and follower guide 47 from this point on until the end of the operation will of necessity be in step by step synchronism.

Therefore, rotation of platen 2 under control of ratchet 35 will be reflected by a corresponding rotation of follower guide 47. Since follower 55 is in engagement with the groove 47b in guide 47, follower 55 will also be rotated in the spiral grooved portion 17b of lead screw 17 and will, at all times, represent the position of the paper being fed through the typewriting machine. Step C2, FIG. 9, is performed in the manner just described.

Movement of the cycle actuating lever 24 downward also results in the stepped portion 28a of pawl 28 being latched on the extension 22b of slider pawl 22. Pawl 28 willl be latched in this manner until the roll-in portion of the cycle has been completed, Step C3. The movement of lever 24 downward and the subsequent latching of pawl 28 causes clevis link 31 to move upwardly. As a result, the index cam trip lever 65 is also moved upwardly and portion 65b of lever 65 is moved downwardly out of engagement with the member 66. Ordinarily, member 66 is prevented from rotation by engagement of a stepped area 66a with the extension 65b of lever 65 as shown in FIG. 5b.

The indexing operation begins as a result of the release of the member 66 and the subsequent rotation of the operational cam 68 on shaft 76. The assembly has a clutch ratchet 87 that is constantly rotated in a manner that is comparable to the rotation of ratchet wheel 410 in the aforementioned Palmer patent. Associated with ratchet 87 is a cam pawl 88. Cam pawl 88 is mounted through a slot 89 to the operational cam 68. Member 66 rotates counter-clockwise when released by lever 65 and cam pawl 88 is permitted to drop into engagement with the constantly rotating clutch ratchet 87. The indexing drive and ratchet clutch mechanism are structurally and operationally identical to that shown and described in U.S. Patent 3,217,856, issued to G. T. Miles, entitled "Paper Feeding Mechanisms for Typewriters," and assigned to the same assignee as the present invention.

Ordinarily, link 31 or a similar link would be activated only for a short interval of time so that extension 65b on lever 65 would move upwardly to engage another step portion on member 66 when that portion moves around into proximity with the extension 65b of lever 65. In the device shown, however, link 31 is maintained in its upper activated position until the roll-in position is reached. This is done by latching the pawl 28 onto the extension 22b of slider pawl 22. Therefore, the indexing cam will continue to remain in engagement with its associated ratchet wheel 87, until such time as the pawl 28 is released as shown in FIG. 5b.

With the engagement of the operational clutch ratchet 87 and the cam pawl 88, as just discussed, the roll-in Steps C4 through C6, FIG. 9, will then be performed.

As noted for Step C4, the follower 55 will advance in the spiral portion 17b of lead screw 17 as a result of the stepping of ratchet 35 and the continued rotation of the follower guide 47.

Figure 8B:
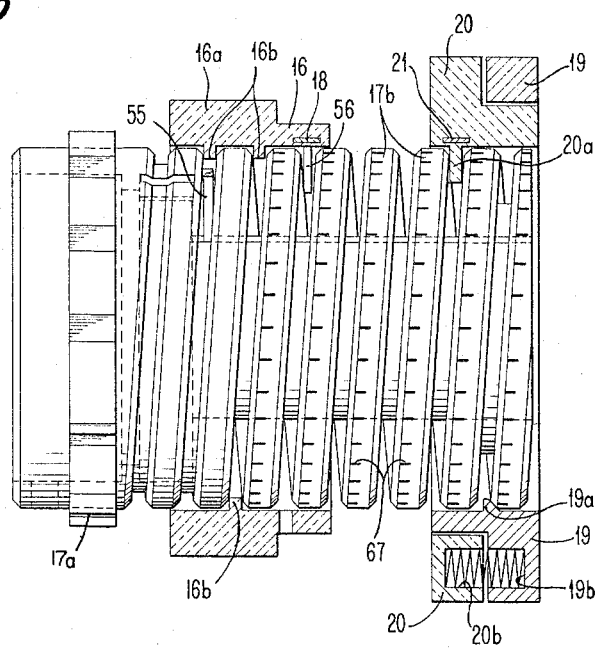

Initially, the follower 55 will be positioned about as shown in FIG. 8b with respect to the roll-in selector knob 16 and the lead screw 17. Continued rotation of the follower guide 47, however, results in the spiral movement of follower 55 within the grooved portion 17b of lead screw 17. This movement of follower 55 occurs step by step since the platen 2 and associated ratchet 35 are being indexed in a step by step fashion as described in connection with FIGS. 6a and 6b.

Figure 8C:
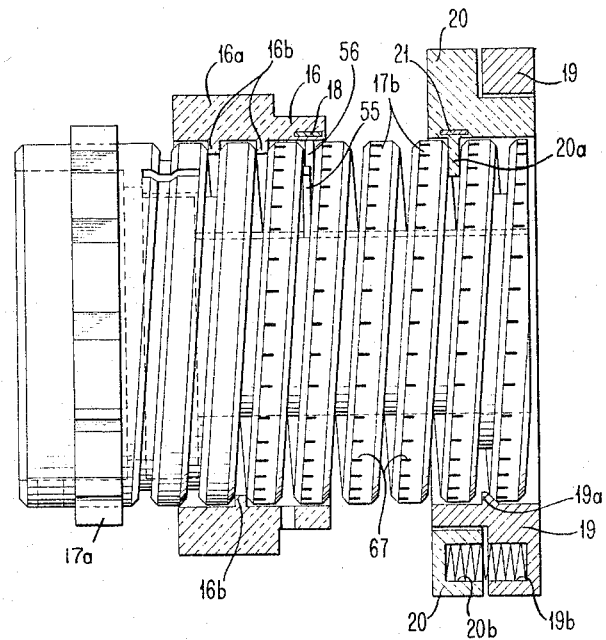

Eventually, follower 55 will move to a position wherein follower 55 will make contact with the spring element 56 that extends into the grooved portion 17b of lead screw 17 as shown in FIG. 8c. When this occurs, follower 55 will exert a certain amount of pressure on spring 56 so that the roll-in selector knob 16 will be rotated. Spring member 56 is made of a flexible material which has enough rigidity to cause a shift rotation of selector knob 16 in order to stop the roll-in operation, but which has enough flexibility to permit the passage and continued movement of the follower 55 as typing proceeds. The direction of rotation of knob 16 will be slightly in a clockwise direction as shown in FIGS. 2 and 5b. It will be recalled that normally the ratchet teeth 16a of roll-in selector knob 16 are in engagement with the detent 22a on slider pawl 22. When roll-in selector knob 16 moves clockwise as a result of the follower 55 having made contact with spring element 56, the engagement of teeth 16a on roll-in selector knob 16 with the detent 22a results in the movement of slider pawl 22 to the left in FIGS. 2 and 5b. As is evident in FIG. 5b, the extension 22b on slider pawl 22 moves out from under the stepped portion 28b on pawl 28 permitting pawl 28 to drop back to a normally inactive position. Concurrently with this, clevis link 31 moves downwardly thereby permitting the lever 65 to rock clockwise moving the portion 65b of lever 65 up into the path of one of the stepped portions of the cam element 66. This releases the indexing mechanism and the platen, with the sheet of paper now in position for typing of the first line. The first line selected will be indicated by the arrow head 18 as shown in FIGS. 8a, 8b, 8c, and 8d. The movement of knob 16 clockwise is just sufficient to disengage pawl 28, but insufficient to move housing 41 enough to disengage the spring clutch. Therefore, the spring clutch remains engaged as shown in FIG. 10b. The foregoing completes the steps designated C4 through C6 in FIG. 9.

Major step D in FIG. 9, including the minor step D1, indicates that typing is then performed by the typist along with line spacing or indexing in either a single space mode or a double space mode as selected under control of lever 13. Step D1 shows that the follower 55 will advance within the lead screw 17 so that it will indicate at all times the line on the sheet of paper which is currently being typed.

Indexing of the platen during the typing operation takes place under control of an Index Key or a Carrier Return Key either of which can be represented by keylever 90, FIG. 5b. Whenever the single element type head is returned to the left hand margin, which is termed a Carrier Return operation, the platen is automatically indexed one or two lines spaces as determined by lever 13. If the keylever 90 is considered to represent the Carrier Return keylever, it will be operatively coupled to a clutch mechanism indicated by dashed box 91 to cause the return of the print head carrier to the left and it will also be operatively coupled to the indexing mechanism through an interposer 92 to cause the indexing operation.

If keylever 90 is considered to represent an Index key, then depression of keylever 90 will cause an Index operation only, without a carrier return operation.

In either case, indexing occurs as follows. The depression of keylever 90 results in the downward movement of a keylever pawl 93. Interposer 92 has a latch 94 pivotally mounted at 95 and normally held latched by engagement of a portion 94a with a guide member 96 under the influence of a spring 97. When keylever 90 is depressed, pawl 93 strikes interposer 92 at 92a and unlatches it from guide 96. Interposer 92 rests on an extension 65c of lever 65. When interposer 92 releases, spring 98 pulls it to the right. Interposer 92 then bears against extension 65c and pushes lever portion 65b downward. Indexing cam 68 is thereby unlatched and an indexing operation then takes place.

Near the end of an indexing cycle, a restore cam 99 moves a restoring link 100 clockwise. Link 100 has a stud 105 which engages interposer 92. Movement of link 100 clockwise causes interposer 92 to move to the left so latch 94 can relatch on guide member 96 in readiness for the next cycle.

Following the completion of typing on the sheet, a roll-out operation occurs as indicated in FIG. 9, as designated by the major step E, Rollout, and minor steps E1–E8.

Step E1 indicates that the cycle keylever 24 is again depressed by the typist when she desires the paper to be moved to the previously selected roll-out position. As noted in Step E1 in FIG. 9, the lead screw 17 has previously been rotated as a result of the roll-in depression of the keylever 24. The clutch therefore still remains engaged. However, depression of keylever 24 does result in the latching of pawl 28 on step 22b of slider pawl 22 in a manner similar to that previously described. Clevis link 31 pulls lever 65 up so that the indexing cam 68 on shaft 76 can rotate and indexing can take place as before. During the course of typing, the follower 55 will have reached some position intermediate the spring member 56 and the abutment of threaded portion of 20a of roll-out selector knob 20.

Figure 8D:
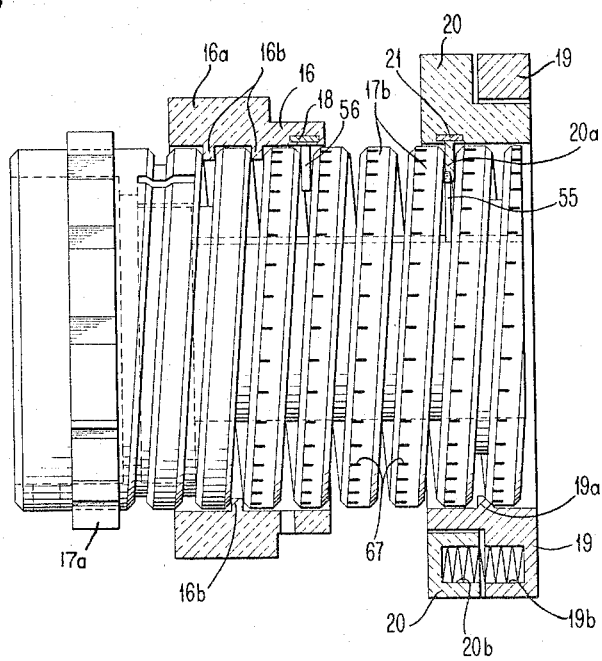

As indexing proceeds following the depression of the actuating keylever 24, the follower 55 will continue to advance in the lead screw 17 in a step by step manner as as the platen is advanced. This is indicated by Step E3. As indicated by Step E4 in FIG. 9, and as shown in FIG. 8d, follower 55 will eventually come into contact with the abutment of threaded portion 20a on roll-out selector knob 20. At Step E5, the engagement of the follower 55 with the abutment of threaded portion 20a causes the rotation of the roll-out selector knob 20 which would be in a generally clockwise direction in FIGS. 2 and 4. Except when a selection is being made by the typist with the roll-out selector knob 20, springs 57 and 58 in FIG. 3 maintain considerable pressure on detent ring 19 and knob 20 so that the combined assembly of ring 19 and knob 20 is fairly firmly engaged with lead screw 17.

As soon as the follower 55 engages the abutment portion of knob 20, therefore, the entire assembly of ring 19, knob 20, and lead screw 17 is rotated clockwise as shown in FIGS. 2 and 4. Movement of the lead screw in this manner causes the previously described camming action of notches 17c in lead screw 17 to be reversed so that housing 41 is restored to its previous inactive position and the spring clutch including spring 44, drive arbor 45, and clutch arbor 46 become disengaged from the follower guide 47, as in FIG. 10a. As a consequence, the paper control mechanism thereupon becomes disengaged from the ratchet 35 and platen 2. This is indicated by Step E6 in FIG. 9. Also, as lead screw 17 rotates, one of the teeth 17a on lead screw 17 engages the extension 28a of pawl 28 and forces pawl 28 to unlatch from the slider pawl 22. This lowers the clevis link 31 and in a manner previously described terminates the indexing operation as indicated by Step E8. In Step E7, FIG. 9, it is indicated that the spiral spring 53, which has been wound up to a tighter condition during the entire indexing operation, now becomes effective. As soon as the spring clutch has become disengaged in Step E6, the tension exerted by spring 53 causes the rotation of follower guide 47 until spring 53 again becomes unwound, Step E7. The rotation of follower guide 47 is in a reverse direction from that in which it rotated during the indexing and paper control operations. Since follower 55 remains engaged with slot 47b in follower guide 47, the rotation of follower guide 47 will cause follower 55 to traverse the grooved portion 17b in lead screw 17 and return to its home position as shown in FIG. 8b.

A number of modifications could readily be made to the mechanism in order to achieve a multiple stop operation. As such, there could be the roll-in operation and the roll-out operation, as just described, plus a number of intermediate stops which, for example, might involve the movement of the platen and the individual sheet of paper to predetermined first lines of paragraphs or sub-paragraphs, or for indexing control purposes other than those described herein. The apparatus described herein is adaptable for a variety of purposes that will be evident. In its basic form as disclosed, the apparatus enables the operator of a typewriting machine to perform the paper loading and positioning operation in a simplified manner. The removal of the paper from the machine is performed in a similarly simplified manner. It is apparent that a substantial savings in time ordinarily required for these operations is thereby achieved. Besides enabling the paper handling functions to be greatly simplified, the apparatus gives a continuous indication of the line that is presently being typed on any inserted sheet of paper.

While the invention has been particularly shown and described with reference to a preferred embodiment, it will be understood by those skilled in the art that various changes in form and details may be made without departing from the spirit and scope of the invention.

What is claimed is:

1. A document handling and control apparatus, comprising:
   a printing station;
   means for supporting and guiding a document;
   feeding means for operating said supporting and guiding means to feed a document past said station;
   selectively operable means for operating said feeding means at desired times during a printing operation;
   control means associated with said supporting and guiding means for operating said feeding means prior to said printing operation to feed a document to an initial printing position with respect to said station, and for operating said feeding means subsequent to said printing operation to feed said document to a second position with respect to said station, said control means having a guide portion with regularly spaced index marks that are representative of increments of movement of said feeding means;
   follower means associated with said control means and positioned for continuous movement from an initial position and in proximity to said index marks to give an indication of the position of said document with respect to said printing station;
   means for coupling said follower means to said supporting and guiding means, said coupling means having an engaged condition and a disengaged condition;
   first manually settable means associated with said control means for selecting said initial printing position, said means having a first element extending into the path of movement of said follower means;
   second manually settable means associated with said control means for selecting said second position, said means having a second element extending into the path of movement of said follower means;
   keylever means associated with said control means and being operable on a first actuation to engage said coupling means and thereby couple said follower means and said supporting and guiding means so that said follower gives a continuous line spacing indication, said keylever means being further operable on said first actuation to initiate operation of said feeding means, and said keylever means being operable on a second depression to again initiate operation of said feeding means;
   means responsive to engagement of said follower means with said first element following said first actuation of said keylever means for stopping operation of said feeding means to thereby locate said document at said initial printing position;
   and means responsive to engagement of said follower means with said second element following said second actuation of said keylever means to again stop said feeding means, to disengage said coupling means, and to restore said follower means to its initial position.

2. In a printing machine, a document handling and control apparatus, comprising:
   a printing station;
   a single element printing means at said station;
   platen means for supporting and guiding a document;
   means associated with said platen means for rotating the same and line spacing a document past said station;
   selectively operable means for operating said line spacing means at desired times during a printing operation;
   control means associated with said platen means for operating said line spacing means prior to said printing operation to feed a document to an initial printing position with respect to said station, and for operating said line spacing means subsequent to said printing operation to feed said document to an eject position with respect to said station, said control means having a guide portion with regularly spaced index marks that are representative of increments of movement of said line spacing means;
   follower means associated with said control means and positioned for continuous movement from an initial position and in proximity to said index marks to give a line spacing indication;

means for coupling said follower means to said platen, said coupling means having an engaged condition and a disengaged condition;

first manually settable means associated with said control means for selecting said initial printing position, said means having a first element extending into the path of movement of said follower means;

second manually settable means associated with said control means for selecting said eject position, said means having a second element extending into the path of movement of said follower means;

keylever means associated with said control means for engaging said coupling means to couple said follower means and said platen means so that said follower gives a continuous line spacing indication, said keylever means being further operable to initiate operation of said line spacing means;

means responsive to engagement of said follower means with said first element for stopping operation of said line spacing means to thereby locate said document at said initial printing position;

means for selectively operating said printing means to print on said document;

means operable under control of said keylever means to again initiate operation of said line spacing means following said printing operation;

and means responsive to engagement of said follower means with said second element to again stop said line spacing means, to disengage said coupling means, and to restore said follower means to its initial position.

3. A document handling and control apparatus, comprising:

a printing station;

platen means for supporting and guiding a document;

means associated with said platen for line spacing a document through said station;

selectively operable means for operating said line spacing means at desired times during a printing operation;

control means associated with said platen means for operating said line spacing means prior to said printing operation to feed a document to an initial printing position with respect to said station, and for operating said line spacing means subsequent to said printing operation to feed said document to an eject position with respect to said station, said control means having a guide portion with regularly spaced index marks that are representative of increments of movement of said line spacing means;

follower means associated with said control means and positioned for continuous movement from an initial position and in proximity to said index marks to give a line spacing indication;

means for coupling said follower means to said platen, said coupling means having an engaged condition and a disengaged condition;

first manually settable means associated with said control means for selecting said initial printing position, said means having a first element extending into the path of movement of said follower means;

second manually settable means associated with said control means for selecting said eject position, said means having a second element extending into the path of movement of said follower means;

keylever means associated with said control means for engaging said coupling means to couple said follower means and said platen means thereby giving a continuous line spacing indication, said keylever means being further operable to initiate operation of said line spacing means;

means responsive to engagement of said follower means with said first element for stopping operation of said line spacing means to thereby locate said document at said initial printing position;

means operable at desired times during printing to further operate said line spacing means to space said document;

means operable under control of said keylever means to again initiate operation of said line spacing means following said printing operation;

and means responsive to engagement of said follower means with said second element to again stop said line spacing means, to disengage said coupling means, and to restore said follower means to its initial position.

4. The apparatus of claim 3 which further comprises:

means for establishing a single spacing mode of operation and a double spacing mode of operation by said line spacing means;

means for controlling the mode of operation of said line spacing means during a printing operation;

wherein said keylever means is further operative from a restored position to a first actuated position or a second actuated position;

wherein a first mode of operation of said line spacing means is established when said keylever is in its first actuated position;

and wherein a second mode of operation of said line spacing means is established when said keylever is in its second actuated position.

5. In a typewriting machine, a document handling and control apparatus, comprising:

a printing station;

rotatable platen means for supporting and guiding a document past said printing station;

indexing means for rotating said platen to thereby feed a document;

a cylindrical lead screw jointly associated with said supporting and guiding means and with said indexing means, said lead screw having a spiral guide portion with regularly spaced index marks on its periphery that are representative of increments of movement of said indexing means;

a follower, said follower being positioned within the grooved portion of said lead screw and in such a manner that it projects toward said periphery adjacent said index marks, and said follower being normally located in an initial position at the beginning of said grooved portion;

a cylindrical follower guide, said guide having a slot for accommodating said follower, and said guide being rotatively positioned within said lead screw in such a manner that the rotation of said guide together with the spiral guiding action of said screw results in a spiral traverse of said follower from its initial position first toward a roll-in position and subsequently toward a roll-out position;

means for coupling said follower guide to said platen means for joint rotation of the same when said indexing means is operated;

a roll-in selector knob, said knob being positioned for selective rotation on the spiral guide portion of said lead screw, and said knob having an indicator and an associated element extending into said spiral guide portion of said lead screw for engagement with said follower as it follows a spiral course from its initial position to its roll-in position;

a roll-out selector knob, said knob being positioned for selective rotation on the spiral guide portion of said lead screw, and said knob having an indicator and an associated abutment portion extending into the spiral guide portion of said lead screw for engagement with said follower as it follows a spiral course from its initial position to its roll-out position;

manually actuated means for initiating operation of said coupling means and said indexing means to thereby effect a spiral rotation of said follower toward the element on said roll-in selector knob and the concurrent feeding of a document toward said printing station;

means operative in response to engagement of said follower with said roll-in element to disengage said indexing means when said document has reached a roll-in position that is determined by the setting of said roll-in selector knob, said means having no effect on said coupling means, whereupon said coupling means continues to couple said platen means with said follower guide;

means effective during a printing operation for operating said indexing means to thereby rotate said platen and feed said document, whereupon said follower rotates and in cooperation with said index marks continually gives an indication of the line space position of said document;

means operative in response to engagement of said follower with the abutment portion of said roll-out selector knob when said document has reached the preselected roll-out postion to disengage said indexing means and said coupling means;

and means operative upon disengagement of said coupling means for restoring said follower to its initial position in readiness for a subsequent document.

6. A line space control apparatus, comprising:
a printing station;
means for supporting and guiding a document;
means for line spacing a document past said sation;
indexing means for operating said line spacing means at desired times during a printing operation;
an actuating keylever movable between active and inactive positions;
line spacing control means responsive to single movement of said actuating keylever to active position prior to said printing operation for operating said line spacing means to feed a document to an initial printing position, and responsive to single movement of said actuating keylever to active position subsequent to said printing operation for operating said line spacing means to feed a document to an eject position;
first manually settable means associated with said control means for selecting said initial printing postion;
means controlled by said first settable means for restoring said actuating lever and said line spacing control means to inactive condition when said initial position has been reached.
second manually settable means associated with said control means for selecting said eject position;
and means controlled by said second settable means for restoring said actuating lever and said line spacing control means to inactive conditions when said eject position has been reached.

7. The apparatus of claim 6 which further comprises:
means associated with said indexing means for selecting a single spacing operation or a double spacing operation of said line spacing means prior to, during or subsequent to said printing operation.

8. A document handling and control apparatus, comprising:
a printing station;
printing means at said station;
means for supporting and guiding a document;
normally inactive means associated with said supporting and guiding means for line spacing a document past said station;
selection means for operating said printing means to print characters on said document;
means for spacing said printing means across said document from an initial position as printing proceeds;
means for returning said printing means to its initial position at desired times during a printing operation;
selectively operable means for operating said line spacing means each time said printing means returns to its initial position during a printing operation;

an actuatable keylever movable between active and inactive positions;
line spacing control means responsive to movement of said keylever to active position prior to said printing operation for operating said line spacing means to feed a document to an initial printing position, and responsive to movement of said actuating keylever to active position subsequent to said printing operation for operating said line spacing means to feed a document to an eject position;
first manually settable means associated with said control means for selecting said initial printing position;
means controlled by said first settable means for restoring said actuating keylever and said line spacing control means to inactive condition when said initial position has been reached;
second manually settable means associated with said control means for selecting said eject position;
and means controlled by said second settable means for restoring said actuating keylever and said line spacing control means to inactive condition when said eject position has been reached.

9. A combined visual line space indicator and line space control apparatus, comprising:
a printing station;
means for supporting and guiding a document;
normally inactive means for line spacing a document past said station;
selectively operable means for operating said line spacing means at desired times during a printing operation;
an actuating keylever movable between active and inactive positions;
line spacing control means responsive to movement of said keylever to active position prior to said printing operation for operating said line spacing means to feed a document to an initial printing position, and responsive means to a second movement of said keylever to active position subsequent to said printing operation for operating said line spacing means to feed a document to an eject position;
a line space indicator member, said member having line reference indications thereon;
a roll-in selector means settably mounted on said indicator member for selecting said initial printing position;
means controlled by said roll-in selector means for restoring said actuating keylever and said line spacing control means to inactive condition when said initial position has been reached;
a roll-out selector means settably mounted on said indicator member for selecting said eject position;
means controlled by said roll-out selector means for restoring said actuating lever and said line spacing control means to inactive condition when said eject position has been reached;
an indicator follower movable from a home position and cooperatively mounted for movement adjacent said line reference indications;
coupling means operable as said actuating lever is first actuated to couple said follower to said line spacing means to thereby move said follower relative to said indications in order to supply a visual line indication as said document is line spaced:
means operable to decouple said follower from said line spacing means when said eject position has been reached;
and means to restore said follower to home position following said decoupling action.

10. The apparatus of claim 9 wherein said coupling means is a spring clutch that is engaged and disengaged by rotative movement of said indicator member, an engaging rotative movement occurring upon first actuation of said acuating keylever, and a disengaging rotative movement occurring as said roll-out selector means renders said line spacing means inactive.

11. A combined line spacing and line indicating apparatus, comprising:
a printing station;
means for supporting and guiding a document;
means for line spacing a document;
control means for operating said line spacing means to feed said document to a predetermined initial position with respect to said printing station, for operating said line spacing means to feed said document past said station during printing, and for operating said line spacing means to feed said document to an eject position subsequent to a printing operation;
manually settable means for selecting said initial position and said eject position;
an actuating keylever;
means responsive to a first depression of said keylever for rendering said control means effective to feed said document to said initial position and responsive to a second depression of said keylever for rendering said control means effective to feed a document to said eject position;
second selectively actuatable means for rendering said control means effective to feed said document during printing operations;
an indicator member having a plurality of line space reference indications corresponding to lines on a document;
an indicator follower, mounted for movement from a home position adjacent said indicator member to thereby supply line space indications;
means coupling said follower to said line spacing means during each document printing operation;
and means for restoring said follower to home position as each document is ejected.

References Cited by the Examiner
UNITED STATES PATENTS

| | | | |
|---|---|---|---|
| 1,110,641 | 9/1914 | Neidig | 197—189 |
| 1,295,307 | 2/1919 | Hawley | 197—189 |
| 1,326,346 | 12/1919 | Hsieh et al. | 197—189 |
| 1,359,445 | 11/1920 | Steiner | 197—189 |
| 1,407,071 | 2/1922 | Larsen | 197—187 X |
| 2,096,086 | 10/1937 | Boisselier | 197—127 |
| 2,407,433 | 9/1946 | Mann | 197—127 |
| 2,463,259 | 3/1949 | Giauque | 197—189 |
| 2,505,769 | 5/1950 | Hassell | 197—189 |
| 2,524,571 | 10/1950 | Pilzer. | |
| 2,633,969 | 4/1953 | Unterweiser | 197—189 |
| 2,711,811 | 6/1955 | Lambert | 197—189 |
| 2,718,956 | 9/1955 | Lepkowski | 197—189 |
| 2,879,876 | 3/1959 | Palmer et al. | 197—16 |
| 2,916,129 | 12/1959 | Parker | 197—128 |
| 3,019,881 | 2/1962 | Cetran et al. | 197—114 |

ROBERT E. PULFREY, *Primary Examiner.*
E. T. WRIGHT, *Assistant Examiner.*